(12) United States Patent
Eggert (10) Patent No.: US 7,967,313 B1
(45) Date of Patent: Jun. 28, 2011

(54) RECREATIONAL VEHICLE WITH ELLIPTICAL DRIVE

(76) Inventor: William E. Eggert, St. Paul, MN (US)

( * ) Notice: Subject to any disclaimer, the term of this patent is extended or adjusted under 35 U.S.C. 154(b) by 68 days.

(21) Appl. No.: 12/202,510

(22) Filed: Sep. 2, 2008

Related U.S. Application Data (60) Provisional application No. 60/969,240, filed on Aug. 31, 2007.

(51) Int. Cl.
*B62M 1/00* (2010.01)
(52) U.S. Cl. ............... 280/224; 280/242.1; 280/253
(58) Field of Classification Search .......... 280/224, 280/225, 221, 242.1, 244, 247, 246, 253, 280/256
See application file for complete search history.

(56) References Cited

U.S. PATENT DOCUMENTS

| | | | |
|---|---|---|---|
| 4,721,015 A | 1/1988 | Hartmann | |
| 5,172,926 A | 12/1992 | Mannino | |
| 5,368,321 A * | 11/1994 | Berman et al. ............... | 280/221 |
| 5,536,029 A * | 7/1996 | Gramckow ................... | 280/263 |
| 5,653,663 A | 8/1997 | McCahon | |
| 5,762,351 A | 6/1998 | SooHoo | |
| 5,775,708 A * | 7/1998 | Heath ........................... | 280/234 |
| 5,836,855 A | 11/1998 | Eschenbach | |
| 6,485,041 B1 | 11/2002 | Janssen | |
| 6,648,353 B1 | 11/2003 | Cabal | |
| 6,708,997 B2 | 3/2004 | Chait | |
| 6,773,022 B2 | 8/2004 | Janssen | |
| 6,920,947 B2 | 7/2005 | Kamen et al. | |
| 7,140,626 B1 | 11/2006 | Keay | |
| 7,175,568 B2 | 2/2007 | Eschenbach | |
| 7,223,210 B2 * | 5/2007 | Krul et al. ..................... | 482/57 |
| 2006/0009331 A1 * | 1/2006 | Cheng .......................... | 482/52 |
| 2007/0001422 A1 | 1/2007 | Kraus | |
| 2007/0219067 A1 | 9/2007 | Mapstone | |
| 2008/0116655 A1 | 5/2008 | Pate et al. | |

FOREIGN PATENT DOCUMENTS

| | | |
|---|---|---|
| DE | 298 02 643 U1 | 7/1997 |
| DE | 201 10 016 U1 | 12/2001 |
| DE | 103 10 659 A1 | 9/2004 |

* cited by examiner

*Primary Examiner* — Kevin Hurley
*Assistant Examiner* — Tashiana Adams
(74) *Attorney, Agent, or Firm* — Haugen Law Firm PLLP; Frederick W. Niebuhr

(57) ABSTRACT

A wheeled vehicle includes a pair of leg driven skis and hand operated levers for simultaneously applying power to a crank and drive sprocket to propel the vehicle. A pair of controllers, one at the top of each thrust lever, include handles that are pushed and pulled to reciprocate the levers and may simultaneously be rotated through wrist and forearm action to steer the vehicle. Auxiliary steering is provided through a handlebar mounted to the vehicle separately from the thrust levers. The skis are operatively coupled to their associated levers, either directly through a pivotal connection or indirectly through an elongate link rotatably coupled at one end to the lever and at the other end to the ski.

33 Claims, 4 Drawing Sheets

RECREATIONAL VEHICLE WITH ELLIPTICAL DRIVE

This application claims the benefit of priority based on Provisional Application No. 60/969,240 entitled "Recreational Vehicle with Elliptical Drive," filed Aug. 31, 2007.

BACKGROUND OF THE INVENTION

The present invention relates to manually powered wheeled vehicles, and more particularly to vehicles equipped to provide a higher level of upper body exercise as compared to conventional bicycles.

For many years, bicycles and other wheeled vehicles on the order of bicycles (e.g. tricycles) have provided recreation, exercise, and enjoyment as well as a useful means of transportation for individuals and their property. The exercise component is somewhat limited, however, in the sense that vigorous activity is concentrated along the lower body as the legs and feet move the pedals in circular paths to propel the drive sprocket. Another concern is the seated position of the rider, which can be a source of discomfort and fatigue over extended periods of use.

To address this latter concern and provide a vehicle propelled by elliptical motion, U.S. Pat. No. 6,648,353 (Cabal) discloses a vehicle on the order of a bicycle in which the rider stands upright while moving a pair of pedals in an elliptical path. To provide the elliptical motion while rotating a crank in a circular path, a pair of elongate foot supports are pivotally attached to the drive sprocket crank at one end while in each case the other end is free to move forwardly and rearwardly relative to a guide track. While this affords elliptical paths for the feet, the most vigorous exercise remains focused on the lower body. U.S. patent application Publication No. 2008/0116655 (Pate et al.) discloses a similar vehicle.

U.S. patent application Publication No. 2006/0009331 (Cheng) proposes a hand-driven vehicle propelled by the rider's arms. The rider stands on a rotatable platform linked to a turnable front wheel but not linked to the driving mechanism. U.S. Pat. No. 6,708,997 (Chait) proposes a hand-powered vehicle steered by leaning the vehicle. As with the Cheng vehicle, the rider stands on a platform that is not linked to the driving mechanism.

Stationary exercise devices have been developed in an effort to provide more balance between upper body and lower body exercise. For example, U.S. Pat. No. 7,175,568 (Eschenbach) shows an exercise apparatus in which the feet travel in elliptical paths while pivotally mounted levers exercise the arms. These exercise devices, often called elliptical cross trainers or simply elliptical trainers, have become very popular at health clubs in recent years.

A variety of mobile elliptical vehicles have been proposed. U.S. Pat. No. 5,775,708 (Heath) discloses a two-wheeled vehicle with push/pull cable steering in which the rider pivots hand levers, one at the top of each arm lever, to turn the front wheel. Riders may have difficulty maintaining the balance of the vehicle, given how the steering handles differ from a typical bicycle handlebar. For moving in a straight line, Heath's steering handles are oriented substantially horizontally and transversely. This positions the backs of the hands to face upward, which is ergonomically undesirable. Most stationary elliptical exercise machines are designed with the tops of arm levers substantially vertical, allowing the user to more comfortably reciprocate the arm levers.

U.S. Pat. No. 7,140,626 (Keay) describes a vehicle in which the rider stands on elongate foot supports or skis to drive two rear wheels. Vertical arm levers drive a single front wheel. Each of the skis is attached to crank arms at the front and at the rear, such that the rider's feet travel in a circular path. The steering method appears to be ergonomically difficult in that the rider must turn the front wheel by rotating a cross bar with the arm levers while reciprocating the arm levers fore and aft.

U.S. Pat. No. 7,223,210 (Krul et al.) describes a four-wheeled vehicle in which the rider stands on a pair of elongate foot supports or skis. The rear of each ski is rotatably attached to a drive crank at the rear of the vehicle. The front of each ski is pivotally attached to the bottom of a swing arm or lever near the front of the vehicle. During operation, the rear of each ski travels in a circular path, while the front of each ski traverses an arcuate path. The rider's feet trace an approximately elliptical or egg-shaped path. Krul allows the rider to use his or her hands to pivot upper sections of the arm levers either left or right to steer the front wheels. During steering, the vehicle and wheels remain substantially perpendicular to the riding surface.

U.S. Patent application Publication No. 2007/0001422 (Kraus) discloses a vehicle similar to Krul's, except with one wheel at the rear and two in front. The vehicle is rear-wheel driven and front wheel steered. In one embodiment, the frame and front wheels are allowed to tilt during a turn. To counteract the tendency of three-wheeled vehicles to tip over during turns, the tilting or leaning function allows the rider to move his or her center of gravity in the direction of the turn. While this may help to prevent tipping, the rider must be agile to control the initiation and extent of the lean, and return to an upright position.

In an alternative embodiment steering approach, Kraus uses pivotally mounted grip ends at the tops of the arm levers. The rider pivots the left grip end to turn left, and pivots the right grip end to turn right. The grip ends do not pivot in concert. Rather, it appears that simultaneous pivoting of the grip ends would apply counteracting forces in a simultaneous attempt to turn the wheel right and left.

In the Krul and Heath vehicles, the rider initiates front wheel toe steering by pivoting upper ends of the arm levers toward the direction of the turn. For example, to initiate a left turn, the rider would use his or her hands and forearms to pivot the tops of both arm levers toward the left. One problem with this method is that while the rider applies a leftward force vector to pivot the upper ends of the arm levers, the upper body tends to counteract the force by leaning to the right. This increases the tendency to tip. For better balance, the rider should lean into the direction of the turn, or at least avoid leaning in the direction opposite the direction of the turn.

Another problem with the Krul and Heath steering approach is that the pivotable upper ends of the arm levers are spaced apart from the planes in which the arm levers reciprocate. This spacing or misalignment varies as the upper ends are pivoted, and causes the hands and arms, when reciprocating the arm levers to propel the vehicle, to also apply an undesirable torque or rotational force to the arm levers. The result is an unwanted twisting along the arm levers, reducing efficiency and generating stress concentrations that can lead to metal fatigue and plastic deformation or fracture.

During operation of the Krul and Kraus vehicles, the rear ends of the skis trace circular paths due to the crank, and the front ends of the skis trace arcuate paths due to the arm levers. This arrangement results in the rider's feet being in a heel-higher-than-toe orientation during much of each cycle of the ski. Crank rotation entails considerable vertical travel of the rear end of each ski, in combination with a less pronounced vertical travel of the ski forward end. Further, the front end oscillates vertically at twice the frequency of the rear end.

This causes a rocking action in the skis, and essentially requires locating the crank near the rear end of the vehicle with the thrust levers in front. Some riders prefer a motion that is closer to stair climbing, and also prefer reduced rocking action for smoother operation.

While the vehicles taught by Kraus, Krul, Heath and Keay may usefully combine upper body and lower body exercise, none of them accommodates the tendency of the shoulders and arms to become fatigued earlier than the legs and feet during extended operation of the vehicle.

Therefore, the present invention has several aspects directed to one or more of the following objects:
  (i) to provide, in a vehicle driven at least partially by hand operated thrust levers, ergonomic thrust lever hand controls that efficiently utilize push/pull forces of the arms and shoulders without applying undesirable rotational moments or torsion to the thrust levers;
  (ii) to provide, in a vehicle powered simultaneously through hand operated thrust levers and leg powered drivers, an indirect coupling of the drivers to a drive crank for smoother operation and reduced rocking action;
  (iii) to provide a steering system for a vehicle powered by hand operated levers, comprised of separate subsystems, one operable from the thrust levers and the other operable independently of the thrust levers; and
  (iv) to provide, in a vehicle powered at least partially by hand operated thrust levers, more natural and user-friendly thrust lever steering controls.

SUMMARY OF THE INVENTION

To achieve these and other objects, there is provided a manually powered and steered vehicle. The vehicle includes a vehicle frame comprising an elongate substantially rigid longitudinal frame member. A plurality of wheels are mounted with respect to the frame member to support the vehicle frame for travel over a surface. The wheels comprise a drive wheel rotatable about a transverse drive wheel axis to propel the vehicle, and a steering wheel rotatable about a steering wheel axis. A steering wheel mounting assembly is provided for mounting the steering wheel to pivot relative to the vehicle frame about a substantially upright steering column axis normal to the steering wheel axis. A vehicle drive system comprises elongate, substantially upright and transversely spaced apart first and second thrust levers mounted to pivot relative to the vehicle frame about a transverse thrust lever axis. The thrust levers comprise respective first and second upper end regions above the thrust lever axis and respective first and second lower end regions below the thrust lever axis. The first and second upper end regions are disposed to be reciprocated along upper arcuate paths in respective first and second planes normal to the thrust lever axis and thereby reciprocate the first and second lower end regions along respective lower arcuate paths. The drive system further comprises a drive mechanism for operably coupling the first and second lower end regions and the drive wheel to rotate the drive wheel about the drive wheel axis responsive to reciprocating the first and second lower end regions. First and second controllers are disposed along the first and second upper end regions, respectively. Each controller is constrained against any substantial linear movement with respect to its associated thrust lever and is rotatable with respect to the associated thrust lever about a controller axis disposed within the associated one of the first and second planes. Each controller further comprises a handle region substantially centered on the control axis. A vehicle steering mechanism operably couples the first and second controllers and the steering wheel mounting assembly to pivot the steering wheel about the steering column axis in a selected steering direction responsive to rotating either one of the controllers about its controller axis in a selected rotational direction corresponding to the selected steering direction.

The controllers and handle regions are positioned and oriented to provide several advantages. One of these is more efficient usage of the push/pull forces exerted through the shoulders and arms of the rider, particularly when the upper end regions of the thrust levers are substantially linear and vertical. With each controller axis located within its associated plane of thrust lever travel, and each handle region centered on its associated axis, the push/pull forces are exerted directly through each upper end region. There is no transverse offset, and accordingly no rotational moment or torque applied to the upper end region. As compared to conventional systems with transversely offset control handles, the present controllers more directly apply and thus more efficiently use the motive force exerted by the operator. In addition, undesirable rotational moments and torque are minimized, increasing the useful life of the thrust levers.

In preferred versions, the handle regions comprise elongate grips that are vertical when oriented for straight line travel. This places the wrists and forearms in the best ergonomic position for reciprocating the thrust levers. The controller axes can be perpendicular to the upper end regions of their associated thrust levers, i.e. substantially horizontal. This enables and facilitates steering by rotating the hands through the wrists and forearms, in lieu of the broader arm and shoulder action required to pivot conventional offset handles. As a result, the countermotion tendency and risk of tipping are substantially reduced. The wrist action steering provides a more natural, comfortable feel to the user, and is more conducive to reciprocation of the thrust levers during turns.

In an alternative system, each grip is parallel to the upper end region of the thrust lever, so that turning is accomplished by rotating the grip about a substantially vertical axis. Again, a broader arm and shoulder movement that might cause tipping is avoided.

Another aspect of the present invention is a manually powered vehicle. The vehicle includes a vehicle frame comprising an elongate substantially rigid longitudinal frame member. A plurality of wheels are mounted with respect to the frame member to support the vehicle frame for travel over a surface. The wheels comprise a drive wheel rotatable about a transverse drive wheel axis to propel the vehicle, and a steering wheel rotatable about a steering wheel axis and further moveable for directional control. A vehicle drive system comprises a crank having oppositely directed first and second crank arms. A drive linkage couples the crank to the drive wheel to rotate the drive wheel responsive to rotation of the crank. An elongate first driver is coupled at a first driver end thereof to the first crank for rotation therewith and has a second driver end supported for substantially longitudinal reciprocation relative to the longitudinal frame member. An elongate second driver is coupled at a first driver end thereof to the second crank arm for rotation therewith and has a second driver end supported for substantially longitudinal reciprocation relative to the frame member. The vehicle drive system further comprises elongate, substantially upright and transversely spaced apart first and second thrust levers mounted to pivot relative to the vehicle frame about a transverse thrust lever axis. The thrust levers have respective first and second upper end regions above the thrust lever axis. The first and second upper end regions are disposed to be reciprocated to pivot the thrust levers and thereby reciprocate respective first and second lower end regions of the thrust levers along respective arcuate paths. The vehicle drive system further comprises an elongate first linking member coupled at a first end thereof to the first lower end region and coupled at a second end thereof to the second driver end of the first driver. An elongate second linking member is coupled at a first end thereof to the second lower end region and coupled at a second end thereof to the second driver end of the second driver.

As compared to previous arrangements with each driver coupled directly to a drive crank and to a bottom portion of a thrust lever, the present arrangement results in simpler, smoother driver action. This is primarily because the end of each driver that is not coupled to the crank moves linearly rather than arcuately, and thus, does not oscillate vertically. Another advantage of the arrangement is that it affords the flexibility to locate the crank and thrust levers at the same end of the vehicle. Preferably the drive crank and thrust levers are near the front of the vehicle, with the forward ends of the drivers rotating with the crank and the rear ends of the drivers supported for longitudinal movement relative to the vehicle frame.

In one preferred version of the vehicle, the drive wheel is located near the front of the vehicle frame, and the drive crank is supported forwardly of the drive wheel. This allows the use of longer drivers or skis, and for a given size crank can considerably reduce the vertical travel of the region of each ski supporting the rider's foot. The result is a smoother ride with less rocking action.

A further aspect of the present invention is a manually powered wheeled vehicle. The vehicle includes a vehicle frame comprising an elongate substantially rigid longitudinal frame member. A plurality of wheels are mounted with respect to the frame member to support the vehicle frame for travel over a surface. The wheels comprise a drive wheel rotatable about a transverse drive wheel axis to propel the vehicle, and a steering wheel rotatable about a steering wheel axis. A steering wheel mounting assembly is provided for mounting the steering wheel to pivot relative to the vehicle frame about a substantially upright steering column axis normal to the steering wheel axis. A vehicle drive system comprises elongate, substantially upright and transversely spaced apart first and second thrust levers mounted to pivot relative to the vehicle frame about a transverse thrust lever axis. The thrust levers comprise respective first and second upper end regions above the thrust lever axis and respective first and second lower end regions below the thrust lever axis. The first and second upper end regions are disposed to be reciprocated along upper arcuate paths and thereby reciprocate the first and second lower end regions along respective lower arcuate paths. The drive system further comprises first and second elongate leg powered drivers having first ends coupled with respect to the first and second lower end regions respectively, and having second ends mounted for rotation relative to the longitudinal frame member. The drive system further comprises a drive mechanism for operably coupling the first and second lower end regions and the second ends of the drivers with the drive wheel to rotate the drive wheel about the drive wheel axis responsive to reciprocating the drivers and the first and second lower end regions. First and second controllers are disposed along the first and second upper end regions, respectively. Each controller is mounted for rotation about a controller axis with respect to its associated thrust lever. A steering device is mounted with respect to the vehicle frame independently of the thrust levers for rotation about a steering device axis relative to the vehicle frame. A steering mechanism operably couples the first and second controllers and the steering device with the steering wheel mounting assembly to pivot the steering wheel about the steering column axis in a selected steering direction responsive to any given one of the following:

(i) rotating the first controller about the first controller axis in a selected rotational direction;
(ii) rotating the second controller about the second controller axis in a selected rotational direction; and
(iii) rotating the steering device about the steering device axis in a selected rotational direction;

wherein each of the selected rotational directions corresponds to the selected steering direction.

This arrangement is particularly well suited for extended trips, where the arms, shoulders, and other parts of the upper body are likely to suffer fatigue earlier than the legs or other parts of the lower body. In the event of such fatigue, the rider can shift his or her hands from the thrust levers to the steering device, more particularly a portion of that device resembling a conventional handlebar. This affords the same degree of steering control, and is more restful for the upper body because the steering device, while rotatable to effect turns, otherwise remains substantially stationary relative to the vehicle frame.

Thus in accordance with the present invention, vehicles powered at least in part through hand operated levers are steerable through more natural, ergonomically preferred motions with minimal risk of tipping. There is a more natural feel, even when the thrust levers are reciprocated during steering. A smoother operation of leg powered drivers is achieved through an indirect coupling of the drivers and hand powered thrust levers. Finally, an auxiliary steering system allows the user to power a manually operated vehicle through the lower body and rest the upper body, while maintaining steering control.

IN THE DRAWINGS

For a further understanding of the above and other features, reference is made to the following detailed description and to the drawings, in which.

DETAILED DESCRIPTION OF THE PREFERRED EMBODIMENTS

Figure 1:
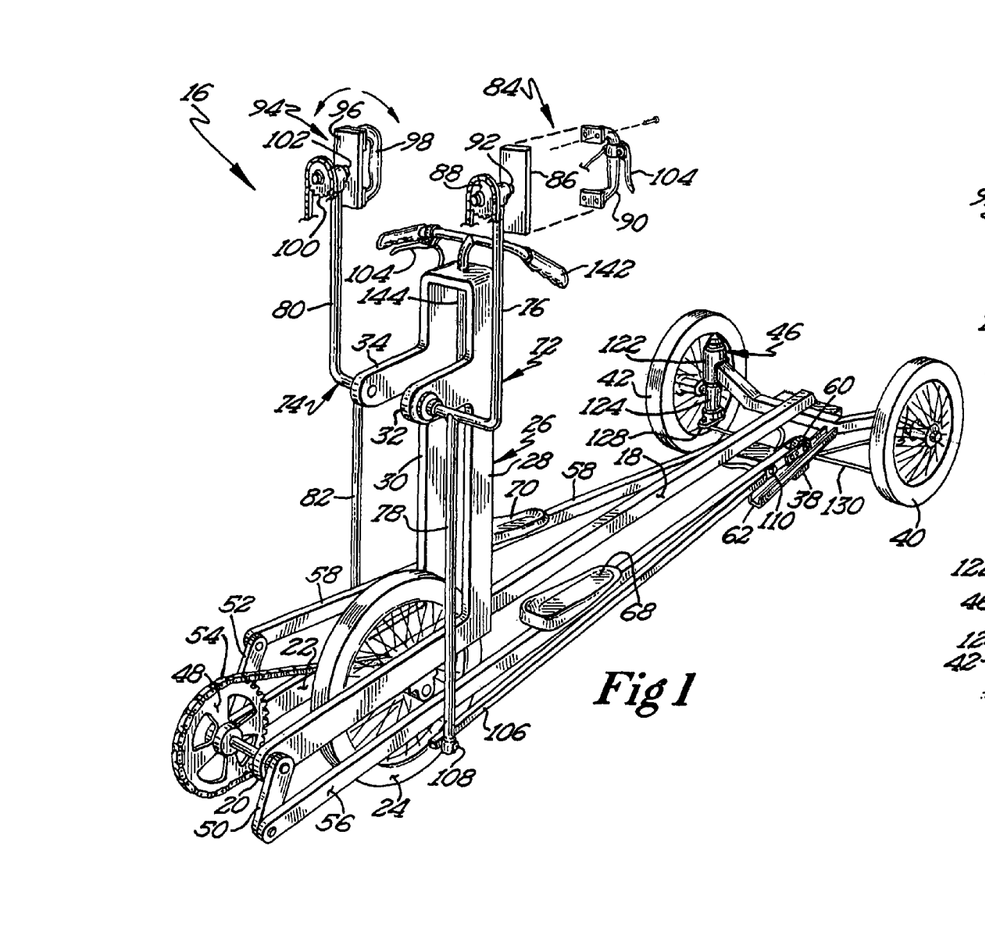
FIG. 1 is a perspective view of a manually powered vehicle constructed in accordance with the present invention.
Figure 2:
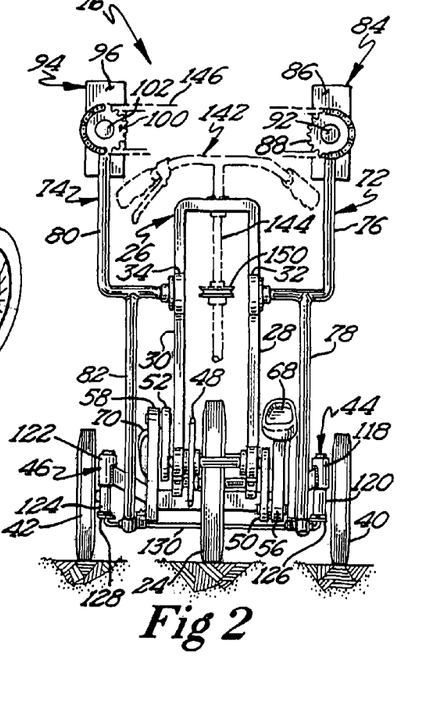
FIG. 2 is a front elevation of the vehicle.
Figures 3, 4:
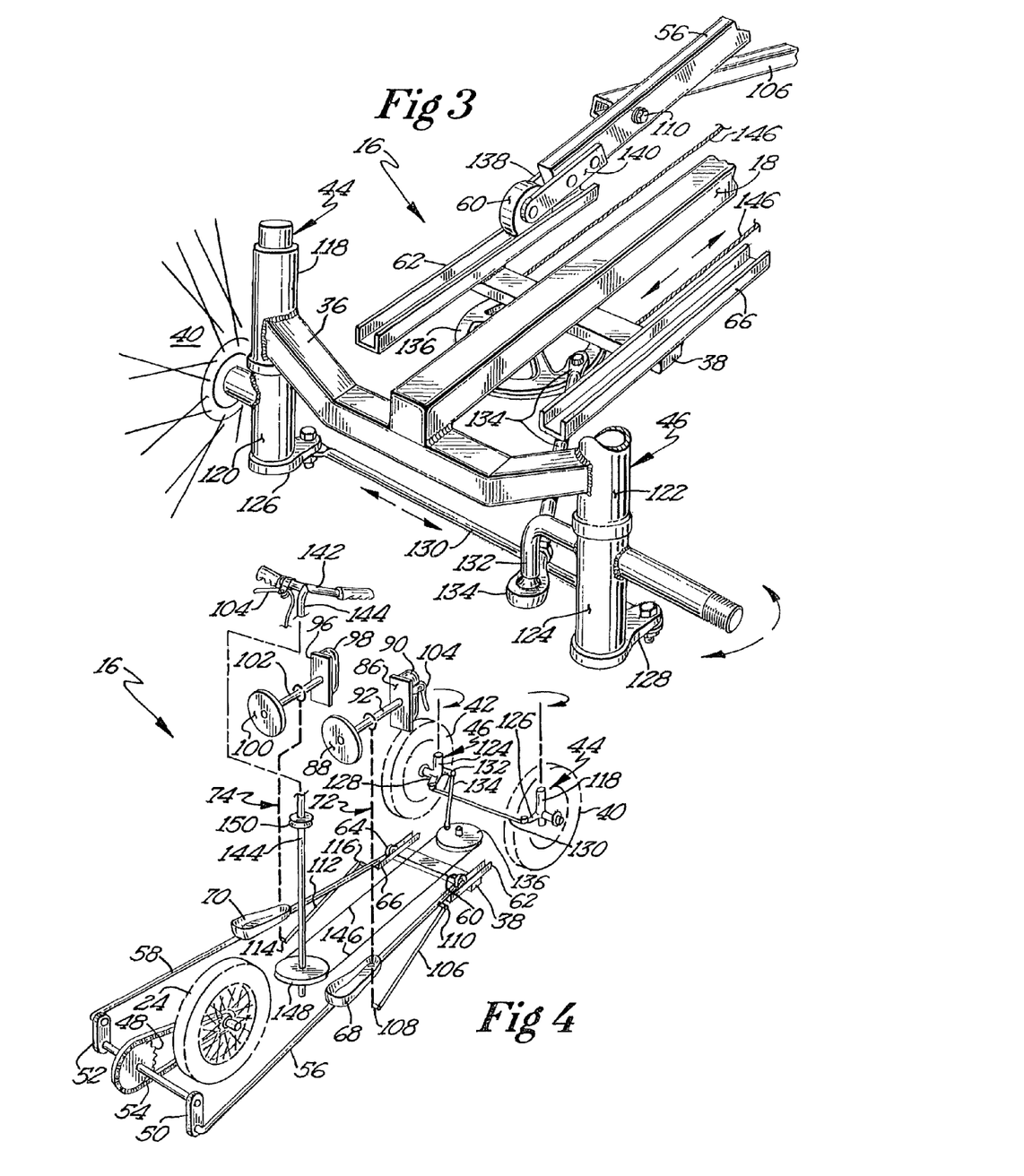
FIG. 3 is an enlarged perspective view showing components disposed at a rearward end of the vehicle.
FIG. 4 is a schematic view illustrating a steering system of the vehicle.

Turning now to the drawings, there is shown in FIGS. 1-3 a manually powered wheeled vehicle 16 constructed in accordance with the present invention. Vehicle 16 has a substantially rigid structural frame including an elongate longitudinal frame member 18. Longitudinal forward frame sections 20 and 22 extend forwardly from opposite sides of frame member 18, forming a fork to accommodate a front wheel 24.

The frame further includes an upright column 26 having left and right upright column sections 28 and 30 on opposite sides of longitudinal frame member 18. Lever support sections 32 and 34 extend forwardly from upright sections 28 and 30, respectively.

A steering wheel mounting structure 36 is fixed to a rearward region of frame member 18 and extends generally transversely away from the frame member in opposite directions. A transverse support or cross member 38 is fixed to frame member 18 at a location slightly ahead of mounting structure 36.

Rear wheels 40 and 42 support mounting structure 36 through respective vertical steering columns 44 and 46. Wheels 40 and 42 cooperate with front wheel 24 to support the vehicle frame for travel over the ground or other surface. Front wheel 24 functions as the drive wheel, while rear wheels 40 and 42 are pivotable about respective steering column axes to steer the vehicle.

Vehicle 16 includes a drive system for rotating front wheel 24 to propel the vehicle. More particularly, a drive sprocket 48 is mounted to forward frame sections 20 and 22 ahead of front wheel 24. The drive sprocket is rotatable about a transverse axis through an integral crank having oppositely directed crank arms 50 and 52. Drive sprocket 48 is coupled to a sprocket of front wheel 24 through a chain 54 trained about both sprockets, for rotating the front wheel by rotating the crank. If desired, the coupling of the crank and front wheel can incorporate a shifting function, e.g. an internal shifting mechanism in a hub of the front wheel, or a set of sprockets with different diameters and a derailleur.

Vehicle 16 includes a drive system through which the operator can use the arm and shoulder muscles as well as the leg muscles to rotate the crank to propel the vehicle. A lower body drive subsystem includes an elongate left driver or ski 56 coupled rotatably at its front end to crank arm 50, and an elongate right driver or ski 58 coupled rotatably at its front end to crank arm 52. A rear end of ski 56 is supported for longitudinal reciprocation relative to the vehicle frame through a roller 60 mounted to the ski and a longitudinally extended U-shaped guide track 62 supported by cross member 38. Similarly, a rear end of ski 58 is supported for longitudinal reciprocation through a roller 64 and guide track 66. In an alternative approach, rollers 60 and 64 can be transversely offset from their respective skis. This permits the use of guide tracks that surround the rollers for more secure containment. Left and right footpads 68 and 70 are supported along medial regions of skis 56 and 58, respectively. Accordingly, during propulsion of the vehicle the forward end of each ski traverses a circular path, the rear end of each ski oscillates longitudinally, and each of the footpads traverses a substantially elliptical path. To propel vehicle 16 primarily with the lower body, the operator uses the left and right feet to move footpads 68 and 70 respectively in their elliptical paths.

An upper body drive subsystem includes an elongate, generally upright left thrust lever 72 mounted to lever support section 32 for rotation relative to the vehicle frame about a transverse thrust lever axis. A similar right thrust lever 74 is mounted to lever support section 34 for rotation about the thrust lever axis. Lever 72 includes an upper end region 76 above the thrust lever axis, and a lower end region 78 below the axis. Lever 74 has similarly situated upper end and lower end regions 80 and 82.

A left lever controller 84 is mounted to lever 72 near the top of upper end region 76. The controller includes a rectangular base or plate 86, a pulley 88 on the opposite side of the lever from the plate, and a handle 90 secured to the plate. A shaft 92 supports the plate, handle, and pulley for rotation in concert relative to lever 72 about a controller axis substantially perpendicular to the lengthwise extension of upper end region 76. In similar fashion, a right side controller 94 includes a rectangular plate 96, a handle 98 secured to the plate, a pulley 100, and a shaft 102 supporting the plate, handle, and pulley for rotation about a controller axis perpendicular to the length of upper end region 80. A handbrake 104 is mounted to handle 90, and a similar handbrake can be mounted to handle 98 if desired.

An operator, while gripping handles 90 and 98 by hand, uses the arm and shoulder muscles in alternative pushing and pulling motions to reciprocate thrust levers 72 and 74 about the thrust lever axis. The tops of upper end regions 76 and 80 traverse arcuate paths in respective planes perpendicular to the thrust lever axis. This causes the bottoms of lower end regions 78 and 82 to likewise traverse arcuate paths in respective planes perpendicular to the thrust lever axis.

To convert the arcuate motion of levers 72 and 74 into crank rotation, the bottom of each lever is coupled with respect to its associated one of skis 56 and 58. The coupling is indirect, in that each lever is coupled to its associated ski through an intermediate link. More particularly, the bottom end of lower end region 78 is coupled rotatably to the forward end of an elongate link 106. The pivotal coupling is indicated at 108. A rearward end of link 106 is coupled rotatably to ski 56 near its rearward end, with the coupling indicated at 110. Likewise, an elongate link 112 is coupled rotatably at its forward end to the bottom of the lower end region 82 at coupling 114, and coupled rotatably at its rearward end to a rearward portion of ski 58 through a coupling at 116.

As thrust lever 72 pivots about the thrust lever axis, the bottom of the thrust lever, including coupling 108, moves in an arcuate path indicated by the arrow. Due to rotational coupling 110 of link 106 to ski 56, the back end of the link and the part of ski 56 near the link reciprocate along a substantially linear path, although the path might be characterized more accurately as an extremely flat ellipse. In any event, as an operator pushes the upper end region of thrust lever 72 forward, coupling 108 moves arcuately but primarily rearward, moving link 106 in the rearward direction as well. In turn, the link moves ski 56 in the rearward direction. The rearward ski movement is accompanied by rotation of the crank and drive sprocket, which propels the vehicle.

As the operator pulls the upper end region of thrust lever 72 rearward, coupling 108 moves forward to pull link 106 forward as well. This in turn pulls ski 56 forward to continue rotating the crank and sprocket.

In a similar manner, thrust lever 74 is coupled to a link 112 which in turn is coupled to a rearward portion of ski 56.

Thrust levers 72 and 74 are complementary in the sense that as upper end region 76 of thrust lever 72 moves in the forward direction, upper region 80 of thrust lever 74 moves in the rearward direction. Skis 56 and 58 are complementary in the same sense. Further, as the upper region of thrust lever 72 moves forward, the bottom region of the lever moves rearward—and along with it, link 106 and ski 56.

As a result of the foregoing relationships, the operator is able to use upper body (arm and shoulder) and lower body (leg) musculature in a contra-body motion to transmit driving force to the crank and drive sprocket 48. In particular, while pushing thrust lever 72 forward with the left arm, the operator simultaneously pulls thrust lever 74 backward, while simultaneously moving ski 58 forward with the right leg and ski 56 backward with the left leg. In the return stroke, the operator pulls lever 72 backward while pushing lever 74 forward, while moving skis 56 and 58 forward and backward, respectively.

Preferably, the drive wheel hub is configured to allow forward rotation of the wheel while its sprocket is stationary, which allows the operator to coast, i.e. to rest the arms and legs while the vehicle continues to move forward.

Vehicle 16 includes a steering mechanism, through which controllers 84 and 94 are operable to steer the vehicle by pivoting rear wheels 40 and 42 about their respective steering column axes. As seen in FIG. 3, steering column 44 includes an upper section 118 integral with steering wheel mounting structure 36, and a lower section 120 contained inside the upper section for rotation relative to the vehicle frame about the steering column axis. Similarly, steering column 46 includes an upper section 122 integral with the wheel mounting structure and a lower section 124 rotatable about the associated steering column axis. Steering arms 126 and 128, integral with lower sections 120 and 124 respectively, are joined by a tie rod 130 so that wheels 40 and 42 pivot in concert.

Steering column 46 further includes a control arm 132 integral with lower section 124. An elongate rod 134, pivotally coupled to the control arm, also is pivotally coupled to a sheave 136 that is coupled to cross member 38 for rotation about a substantially vertical sheave axis. Sheave 136 is rotatable in alternative directions, either to pull arm 132 to rotate lower section 124 clockwise or to the right as viewed in FIG. 3, or to push the control arm for counterclockwise rotation of the lower section.

FIG. 3 also shows the longitudinal orientation of guide tracks 62 and 66, along with their locations at opposite ends of cross member 38. Also visible are brackets 138 and 140 used to mount roller 60 with respect to the back end of ski 56. Also shown is pivotal coupling 110 between ski 56 and the back end of link 106.

Because of the rotatable mounting of controllers 84 and 94, handles 90 and 98 can be used to pivot rear wheels 40 and 42 to steer vehicle 16. In addition, vehicle 16 is equipped with an auxiliary steering control in the form of a handlebar 142 and a handlebar shaft 144 mounted with respect to upright column 26 for rotation relative to the vehicle frame about a substantially vertical steering axis. Handlebar 142 enables the operator to steer the vehicle independently of controllers 84 and 94, e.g. while resting the arms and shoulders and using only the legs and feet to propel the vehicle.

FIG. 4 schematically illustrates a system of inextensible cables 146 used to associate the controllers 84 and 94 along with handlebar 142 with sheave 136 for vehicle steering. Although the precise arrangement of cables is not shown in detail, those of skill in the art of manually powered vehicles, e.g. bicycles, are aware of techniques employing pulleys and low friction (Teflon) guides directing inextensible cables along vehicle frame members, to operatively link moving components of steering, breaking, and gear shifting systems.

As previously noted, rear steering wheels 40 and 42 are linked by tie rod 130 to pivot in concert about respective steering column axes, as controlled by sheave 136 through rod 134. As seen in FIG. 4, cables 146 are trained about sheave 136 and a pulley 148 at the bottom of handlebar shaft 144. Accordingly, turning the handlebar to rotate pulley 148 likewise rotates sheave 136. For a right turn, the operator rotates handlebar 142 to the right for clockwise rotation of shaft 144 and pulley 148 (as viewed from above). Due to cables 146, this rotates sheave 136 clockwise. Clockwise rotation of sheave 136 pushes rod 134 generally rearwardly against control arm 132, causing wheels 40 and 42 to rotate counterclockwise or to the left. This is the preferred result in a vehicle with rear wheel steering, because pivoting the steering wheels to the left actually steers the vehicle to the right. In similar fashion, turning handlebar 142 to the left pivots rear wheels 40 and 42 to the right, steering vehicle 16 to the left.

The steering mechanism includes additional cables 146 trained about pulleys 88, 100, and a pulley 150 fixed about shaft 144 at the height of the thrust lever axis. This operatively links controllers 84 and 94 to operate in concert with handlebar 142 and shaft 144. For example, to turn right while reciprocating thrust levers 72 and 74, the operator uses the wrists and forearms to rotate handles 90 and 98 clockwise from the operator's point of view (or counterclockwise as viewed in FIG. 2). This rotates pulleys 88 and 100 in the same direction, and further rotates pulley 150 clockwise as viewed from above. This rotates shaft 144 and pulley 148 clockwise as well, to pivot rear wheels 40 and 42 to the left as before, to steer the vehicle to the right.

The rear wheel steering can be likened to steering a boat with a tiller. Although an operator with no rear wheel steering experience may require a brief time to become accustomed to this form of steering, stability is improved, especially in vehicles with a single front wheel. During turns, the rear wheels carry the rearward end of the vehicle in an opposite direction (i.e. to the left during a right turn), counteracting the tendency to tip during the turn.

The inextensible linkage affords several options to the operator wishing to turn vehicle 16: turning handlebar 142 in the chosen direction; rotating handles 90 and 98 in the chosen direction; and rotating either one of the handles in that direction. Rotating handlebar 142 causes handles 90 and 98 to rotate as well. Rotating either of the handles causes the other handle and handlebar 142 to rotate.

As a result, the operator can employ the complete drive system and use the upper body and lower body to power the vehicle, or alternatively use only the lower body subsystem while resting the arms and shoulders, while maintaining full steering control at all times.

As noted above, each of upper end regions 76 and 80 during use is reciprocated in an arcuate path that lies within a plane perpendicular to the thrust lever axis. Each controller axis lies within its associated plane of thrust lever travel. Further, each of handles 90 and 98 is centered on its associated controller axis.

Given the upright extension of upper end regions 76 and 80, the handles are positioned for maximum efficiency in terms of using the push/pull forces exerted through the operator's arms and shoulders. These forces are exerted directly through the upper end regions. There is no transverse offset of the force vector from the upper end regions, and thus no rotational moment applied to each upper end region about its lengthwise axis. This more effectively employs the operator's motive force, and increases the useful life of the thrust levers by minimizing undesirable rotational moments and torque.

Figure 5:
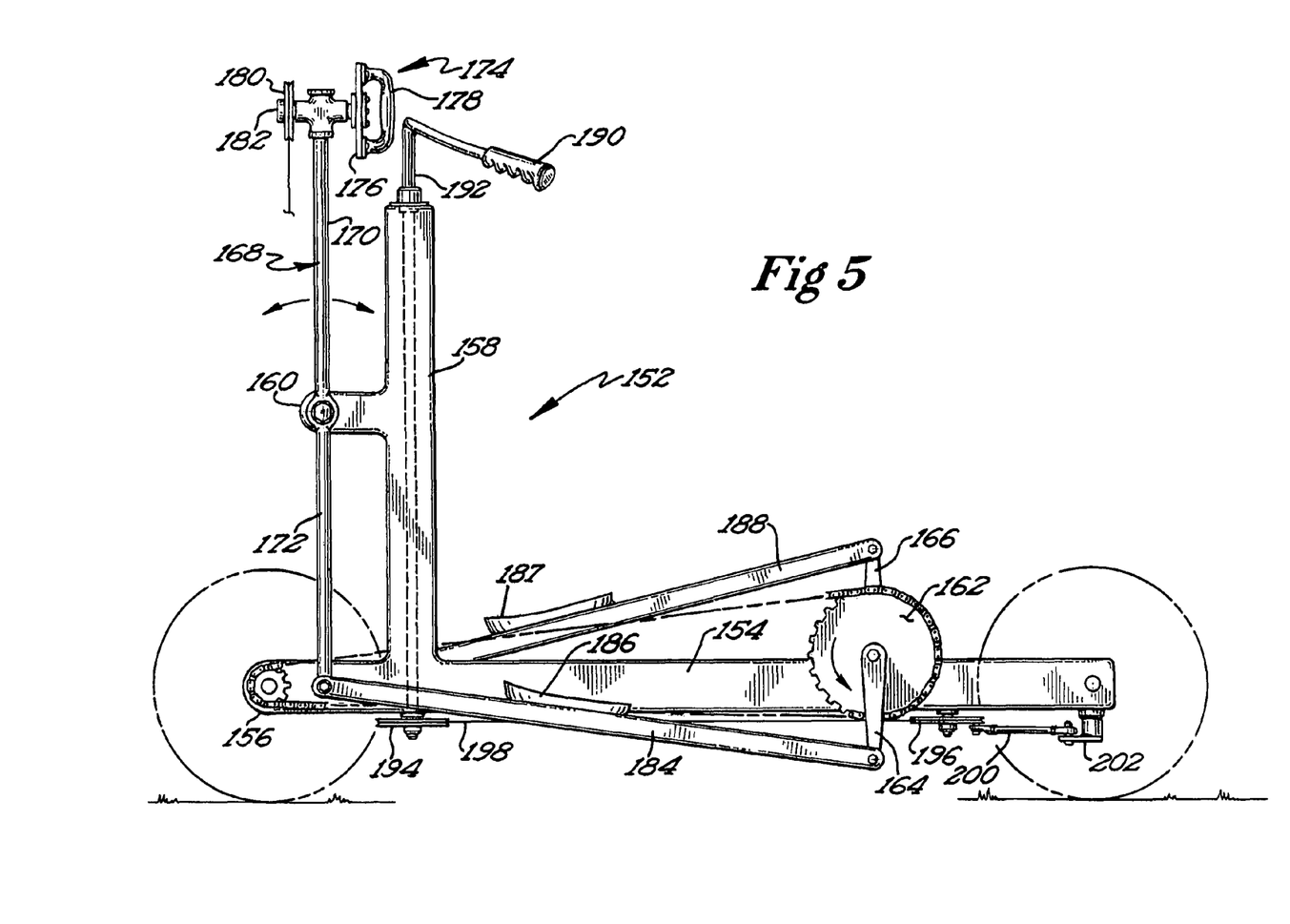
FIG. 5 is a side elevation of an alternative embodiment vehicle.

FIG. 5 illustrates an alternative vehicle 152 with a vehicle frame including an elongate longitudinal frame member 154, opposite forwardly extending frame section extensions (one shown at 156) forming a fork to accommodate a front drive wheel, and an upwardly extending column 158 including separate sections and forwardly extending lever supports, one of which is shown in 160.

The vehicle drive system includes a drive sprocket 162 and an integral crank with oppositely directed crank arms 164 and 166 mounted to rotate about a transverse axis near the back end of frame member 154. A pair of thrust levers, one of which is shown at 168, are mounted to the lever support sections as before to pivot about a transverse thrust lever axis. Thrust lever 168 includes an upper end region 170 and a lower end region 172. At the top of the upper end region is a controller 174 including a rectangular plate 176, a handle 178 fixed to the plate, a pulley 180, and a shaft 182 mounting the other components for rotation about a controller axis perpendicular to the lengthwise extension of upper end region 170. A similar controller is mounted on top of the other (right) thrust lever. Ski 188 supports a footpad 187.

A left ski or driver 184 is coupled at its forward end for rotation relative to thrust lever 168 about a transverse pivot axis. A rearward end of the ski is coupled for rotation relative to crank arm 164 about a transverse axis. A footpad 186 is supported by ski 184. On the opposite side of frame member 154 is a right driver or ski 188, coupled at its rearward end to rotate relative to crank arm 166. A forward end of ski 188 is coupled rotatably to the bottom of the right thrust lever.

As before, the vehicle is powered by simultaneously reciprocating the skis and the thrust levers. In a departure from vehicle 16, the drive sprocket and crank are mounted at the rear of the vehicle, and the skis are coupled directly their associated thrust levers. There are no components equivalent to links 106 and 112.

As a result, the motion of each ski is somewhat more complex as compared to that of skis 56 and 58. The end of each ski coupled to the crank moves at a circular path as before. The opposite end of each ski, exemplified by the forward end of ski 184, moves in an arcuate path as determined by thrust lever 168, although the path is close to linear (longitudinal) in view of the length of lower end region 172 and the short range of angular travel of the thrust lever.

Vehicle 152, like vehicle 16, features front wheel drive and rear wheel steering. With drive sprocket 162 mounted near the back of frame member 154, its increased distance from the front wheel sprocket requires either a longer chain or an alternative linkage.

A handlebar 190 and an upright handlebar shaft 192 are mounted to rotate relative to the vehicle about a substantially vertical axis. A pulley 194 fixed to a lower end of shaft 192 is coupled to a rotatable sheave 196 through a cable linkage 198. As in the previous steering mechanism, turning handlebar 190 causes sheave 196 to rotate, either pulling or pushing a rod 200 to pivot a control arm 202 to pivot the rear steering wheels in the desired direction.

Figure 6:
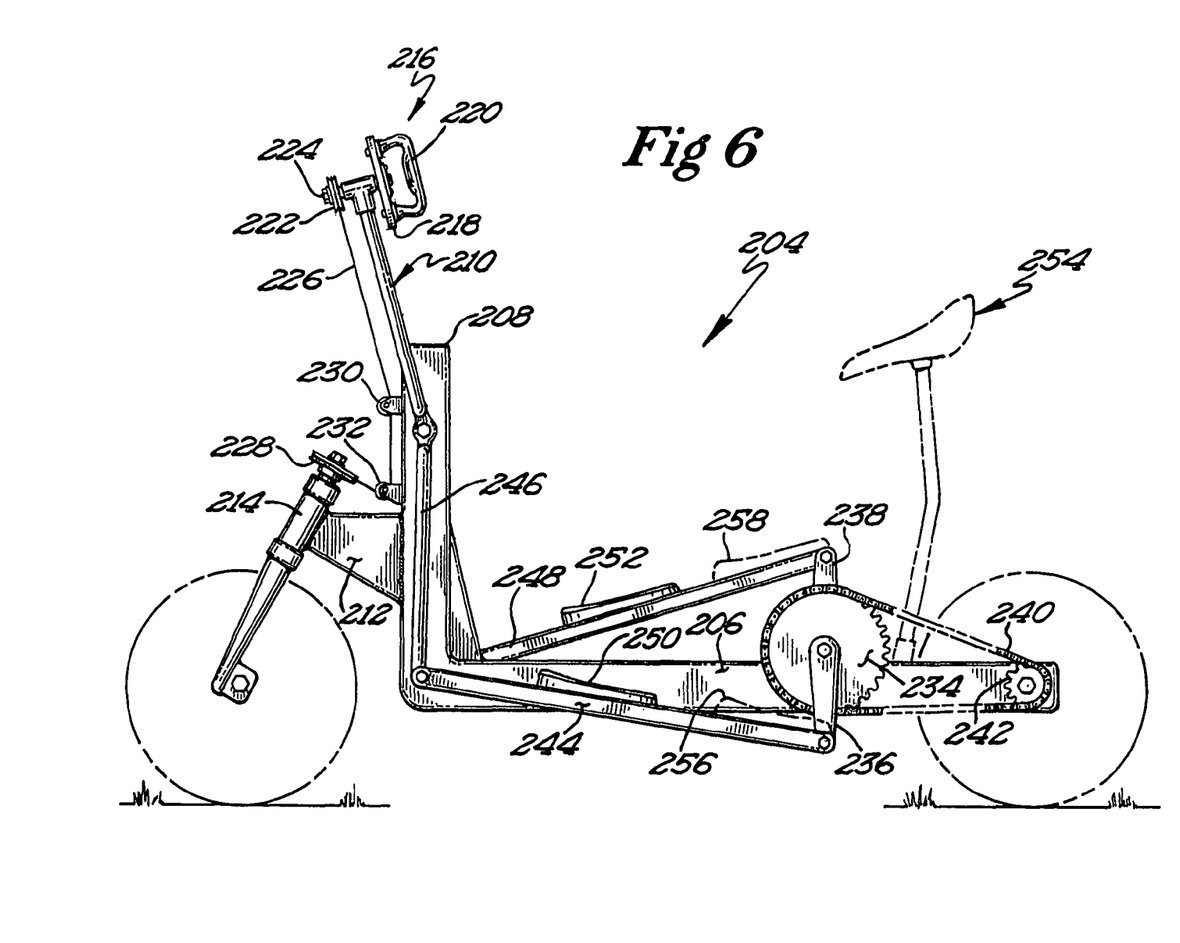
FIG. 6 is a side elevation showing a further alternative embodiment vehicle.

FIG. 6 illustrates a further alternative version of vehicle 204. A vehicle frame includes an elongate longitudinal frame member 206 with opposite longitudinal sections extending rearwardly from the frame member to form a fork that accommodates a rear drive wheel. A column 208, extending upwardly from frame member 206, supports a pair of thrust levers, one of which is shown at 210, for rotation about a transverse thrust lever axis. A forward extension 212 of the frame supports a steering column 214 through which a front wheel is pivoted about an axis extending in the steering column length direction, to provide front wheel steering. A controller 216 at the top of lever 210 includes a plate 218, a handle 220 attached to the plate, a pulley 222, and a shaft 224 mounting the other components for rotation about a controller axis. A cable 226, trained about pulley 222 and a steering column pulley 228, operatively associates the pulleys so that the front steering wheel can be pivoted by rotating handle 220. Guide pulleys 230 and 232 contain the cable. In similar fashion, a cable operatively associates pulley 228 with the pulley of a controller on the right side thrust lever, not shown.

A drive sprocket 234 and integral crank arms 236 and 238 are mounted rotatably with respect to frame member 206. A chain 240 associates the drive sprocket with a sprocket 242 of the drive wheel. A left driver or ski is coupled rotatably to a lower end region 246 of lever 210 and to crank arm 236, in the manner similar to ski 184 of vehicle 152. Likewise, a right driver or ski 248 is pivotably coupled to crank arm 238 and the opposite thrust lever lower end region. Skis 244 and 248 support footpads 250 and 252, respectively.

Any of vehicles 16, 152, and 204 can be modified to accommodate a rider in addition to the operator. To this end, the broken lines in FIG. 6 illustrate a seat 254 mounted to frame member 206 near the back, and additional foot pads 256 and 258 mounted to the backs of skis 244 and 248, respectively.

Figure 7:
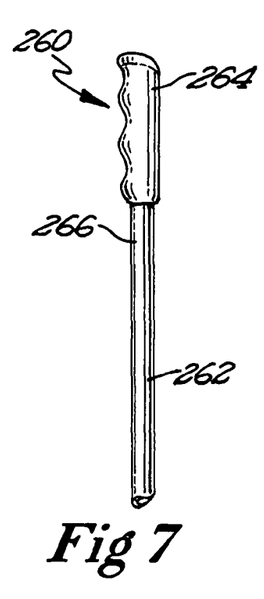
FIG. 7 illustrates an alternate lever mounted controller for steering.

FIG. 7 illustrates an alternative version of a controller 260 mounted for rotation with respect to the upper end region of a thrust lever 262. Although only one thrust lever and controller are shown, it is to be appreciated that an opposite side thrust lever similarly is equipped with a controller that is coupled to be rotated in concert with controller 260.

Controller 260 is has an elongate handle or hand grip 264 that is elongate in the lengthwise direction of an upper end region 266 of the lever. For steering, handle 264 is rotatable about a controller axis which extends in the lengthwise direction of the upper end region. Accordingly, although the controller axis is perpendicular to the controller axes in previously described controllers, the controller axis remains situated in the plane of thrust lever arcuate travel, and the handle remains centered on the controller axis.

Certain features, although not illustrated or discussed in detail, may be employed in constructing vehicles according to the present invention. For example, the steering mechanism may employ chains turned about sprockets in lieu of cables trained about pulleys, or may employ hydraulic or servo controls. In vehicles 16 and 152, the substantially vertical column may be located further forward, eliminating the need for the lever support sections. The drive system preferably incorporates a freewheeling or ratchet feature, so that the operator can maintain the thrust levers and skis at rest while coasting in the forward direction, if desired. Finally, the crank arms can be provided with sets of radially spaced apart coupling points for ski attachment, to selectively alter the crank radius to suit different riders.

Thus in accordance with the present invention, wheeled vehicle can be powered simultaneously through hand operated levers and leg driven skis, utilizing and exercising both upper body and lower body musculature. The levers are provided with steering controls, positioned for more efficient use of upper body applied force and more comfortable, natural steering control. A smoother, simpler motion of the leg powered drivers is achieved through an indirect coupling of the drivers and the hand operated levers through elongated links. An auxiliary steering system, preferably in the form of a handlebar, allows the operator to maintain positive steering control while resting the shoulders and arms.

What is claimed is:

1. A manually powered and steered vehicle, including:
   a vehicle frame comprising an elongate substantially rigid longitudinal frame member;
   a plurality of wheels mounted with respect to the frame member to support the vehicle frame for travel over a surface, the wheels comprising a drive wheel rotatable about a transverse drive wheel axis to propel the vehicle, and a steering wheel rotatable about a steering wheel axis;
   a steering wheel mounting assembly for mounting the steering wheel to pivot relative to the vehicle frame about a substantially upright steering column axis normal to the steering wheel axis;
   a vehicle drive system comprising elongate, substantially upright and transversely spaced apart first and second thrust levers mounted to pivot relative to the vehicle frame about a transverse thrust lever axis, the thrust levers comprising respective first and second upper end regions above the thrust lever axis and respective first and second lower end regions below the thrust lever axis, wherein the first and second upper end regions are disposed to be reciprocated along upper arcuate paths in respective first and second planes normal to the thrust lever axis and thereby reciprocate the first and second lower end regions along respective lower arcuate paths;

wherein the drive system further comprises a drive mechanism for operably coupling the first and second lower end regions and the drive wheel to rotate the drive wheel about the drive wheel axis responsive to reciprocating the first and second lower end regions;

first and second controllers disposed along the first and second upper end regions, respectively, wherein each controller is constrained against any substantial linear movement with respect to its associated thrust lever and is rotatable with respect to the associated thrust lever about a controller axis disposed within the associated one of said first and second planes, and wherein each controller comprises a handle region substantially centered on the control axis; and a vehicle steering mechanism operably coupling the first and second controllers and the steering wheel mounting assembly to pivot the steering wheel about the steering column axis in a selected steering direction responsive to rotating either one of the controllers about its controller axis in a selected rotational direction corresponding to the selected steering direction.

2. The vehicle of claim 1 wherein:
the drive mechanism comprises a crank with oppositely directed first and second crank arms, a drive linkage adapted to couple the crank to rotate with the drive wheel, a first elongate driver coupled at a first driver end thereof to the first crank arm for rotation therewith and coupled at a second driver end thereof with respect to the first lower end region to reciprocate with the first lower end region, and a second elongate driver coupled at a first driver end thereof to the second crank arm for rotation therewith and coupled at a second end thereof with respect to the second lower end region to reciprocate with the second lower end region.

3. The vehicle of claim 2 further including:
an elongate first linking member pivotally coupled at a first end thereof to the first lower end region and further pivotally coupled at a second end thereof to the second driver end of the first driver; and
an elongate second linking member pivotally coupled at a first end thereof to the second lower end region and further pivotally coupled at a second end thereof to the second driver end of the second driver.

4. The vehicle of claim 3 wherein:
the crank and the drive wheel are located near a forward end of the longitudinal frame member.

5. The vehicle of claim 2 wherein:
the second driver end of the first driver is coupled pivotally to the first lower end region, and the second driver end of the second driver is coupled pivotally to the second lower end region.

6. The vehicle of claim 5 wherein:
the crank is located forwardly of the drive wheel, and the drive wheel is located near a rearward end of the longitudinal frame member.

7. The vehicle of claim 5 wherein:
the crank and the drive wheel are located near a rearward end of the longitudinal frame member.

8. The vehicle of claim 2 wherein:
the drive linkage comprises a first sprocket rotatable with the crank, a second sprocket rotatable with the drive wheel, and a chain trained around the first and second sprockets.

9. The vehicle of claim 1 wherein:
The handle regions of the first and second controllers comprise elongate hand grips that are substantially vertically disposed when oriented for linear travel of the vehicle frame.

10. The vehicle of claim 1 wherein:
Each of the controller axes is substantially perpendicular to a lengthwise extension of the upper end region of its associated thrust lever.

11. The vehicle of claim 1 wherein:
each of the controller axes is substantially parallel to a lengthwise extension of the upper end region of its associated thrust lever.

12. The vehicle of claim 1 wherein:
the vehicle steering mechanism incorporates a flexible and inextensible linkage adapted to couple the first and second controllers for rotation in concert and in the same rotational direction.

13. The vehicle of claim 12 further including:
an auxiliary steering handle mounted to pivot with respect to the vehicle frame about an auxiliary axis and coupled to the steering wheel mounting assembly through the steering mechanism such that the flexible inextensible linkage further is adapted to pivot the auxiliary steering handle in concert with rotating the first and second controllers.

14. A manually powered vehicle, including:
a vehicle frame comprising an elongate substantially rigid longitudinal frame member:
a plurality of wheels mounted with respect to the frame member to support the vehicle frame for travel over a surface, the wheels comprising a drive wheel rotatable about a transverse drive wheel axis to propel the vehicle, and a steering wheel rotatable about a steering wheel axis and further moveable for directional control;
a vehicle drive system comprising a crank having oppositely directed first and second crank arms, a drive linkage coupling the crank to the drive wheel to rotate the drive wheel responsive to rotation of the crank, an elongate first driver coupled at a first driver end thereof to the first crank arm for rotation therewith and having a second driver end supported for substantially longitudinal reciprocation relative to the longitudinal frame member, and an elongate second driver coupled at a first driver end thereof to the second crank arm for rotation therewith and having a second driver end supported for substantially longitudinal reciprocation relative to the frame member;
wherein the vehicle drive system further comprises elongate, substantially upright and transversely spaced apart first and second thrust levers mounted to pivot relative to the vehicle frame about a transverse thrust lever axis, the thrust levers having respective first and second upper end regions above the thrust lever axis, wherein the first and second upper end regions are disposed to be reciprocated to pivot the thrust levers and thereby reciprocate respective first and second lower end regions of the thrust levers along respective arcuate paths;
wherein the vehicle drive system further comprises an elongate first linking member coupled at a first end thereof to the first lower end region and coupled at a second end thereof to the second driver end of the first driver, and an elongate second linking member coupled at a first end thereof to the second lower end region and coupled at a second end thereof to the second driver end of the second driver, said linking members extending lengthwise in planes substantially perpendicular to the drive wheel axis.

15. The vehicle of claim 14 wherein:
the crank is located near a forward end of the longitudinal frame member.

16. The vehicle of claim 15 wherein:
the drive wheel is located near a forward end of the longitudinal frame member.

17. The vehicle of claim 16 wherein:
the crank is disposed ahead of the drive wheel.

18. The vehicle of claim 15 wherein:
the drive wheel is located near a rearward end of the longitudinal frame member.

19. The vehicle of claim 14 wherein:
the drive linkage comprises a first sprocket coaxial with and rotatable with the crank, a second sprocket coaxial with and rotatable with the drive wheel, and a chain drivably engaged with the first and second sprockets.

20. The vehicle of claim 14 further including:
first and second footpads mounted to the first and second drivers, respectively, to facilitate use of the legs to drive the crank.

21. The vehicle of claim 14 further including:
a guide assembly for supporting the second driver ends of the first and second drivers for said substantially longitudinal reciprocation relative to the longitudinal frame member.

22. The vehicle of claim 14 wherein:
each of the first and second linking members is coupled pivotally to its associated lower end region and second driver end.

23. The vehicle of claim 14 further including:
a steering wheel mounting assembly for mounting the steering wheel to pivot relative to the vehicle frame about a substantially upright steering column axis, first and second controllers mounted along the first and second upper end regions of the thrust levers, and a vehicle steering mechanism operably coupling the first and second controllers and the steering mounting assembly to pivot the steering wheel about the steering column axis in a selected steering direction responsive to rotating either one of the controllers about a controller axis thereof in a selected rotational direction corresponding to the selected steering direction.

24. The vehicle of claim 23 wherein:
the first and second upper end regions are mounted for reciprocation along upper arcuate paths in respective first and second planes normal to the thrust lever axis; and
each controller is constrained against any substantial linear movement with respect to its associated thrust lever, each controller axis is disposed within its associated one of the first and second planes, and each controller comprises a handle region substantially centered on the associated controller axis.

25. A manually powered wheeled vehicle, including:
a vehicle frame comprising an elongate substantially rigid longitudinal frame member;
a plurality of wheels mounted with respect to the frame member to support the vehicle frame for travel over a surface, the wheels comprising a drive wheel rotatable about a transverse drive wheel axis to propel the vehicle, and a steering wheel rotatable about a steering wheel axis;
a steering wheel mounting assembly for mounting the steering wheel to pivot relative to the vehicle frame about a substantially upright steering column axis normal to the steering wheel axis;
a vehicle drive system comprising elongate, substantially upright and transversely spaced apart first and second thrust levers mounted to pivot relative to the vehicle frame about a transverse thrust lever axis, the thrust levers comprising respective first and second upper end regions above the thrust lever axis and respective first and second lower end regions below the thrust lever axis, wherein the first and second upper end regions are disposed to be reciprocated along upper arcuate paths and thereby reciprocate the first and second lower end regions along respective lower arcuate paths;
wherein the drive system further comprises a drive mechanism for operably coupling the first and second lower end regions with respect to the drive wheel to rotate the drive wheel about the drive wheel axis responsive to reciprocating the first and second lower end regions along their respective lower arcuate paths;
first and second controllers disposed along the first and second upper end regions, respectively, each controller mounted for rotation about a controller axis with respect to its associated thrust lever;
a steering device mounted with respect to the vehicle frame independently of the thrust levers for rotation about a steering device axis relative to the vehicle frame; and
a steering mechanism operably coupling the first and second controllers and the steering device with the steering wheel mounting assembly to pivot the steering wheel about the steering column axis in a selected steering direction responsive to any given one of the following:
  (i) rotating the first controller about the first controller axis in a selected rotational direction;
  (ii) rotating the second controller about the second controller axis in a selected rotational direction; and
  (iii) rotating the steering device about the steering device axis in a selected rotational direction;
wherein each of the selected rotational directions corresponds to the selected steering direction.

26. The vehicle of claim 25 wherein:
the steering mechanism comprises a flexible and substantially inextensible linkage adapted to couple the first controller, the second controller and the steering device for rotation in concert.

27. The vehicle of claim 25 wherein:
the upper arcuate paths traversed by the first and second upper end regions are disposed in respective first and second planes normal to the thrust lever axis;
the first and second controller axes are disposed within the first and second planes, respectively; and
each of the controllers comprises a handle region substantially centered on the associated controller axis.

28. The vehicle of claim 25 wherein:
each of the controller axes is perpendicular to a lengthwise extension of its associated upper end region.

29. The vehicle of claim 25 wherein:
each of the controller axes is parallel to a lengthwise extension of the associated upper end region.

30. The vehicle of claim 25 wherein:
the steering device comprises a generally horizontally and transversely extending handlebar, and a substantially upright shaft supporting the handlebar for rotation about the steering device axis.

31. The vehicle of claim 25 wherein the drive mechanism further comprises:
a crank having first and second crank arms and a drive linkage coupling the drive wheel to the crank to rotate the drive wheel responsive to rotation of the crank; and
first and second elongate members having respective first ends coupled with respect to the first and second lower end regions respectively, and having respective second ends coupled with respect to the first and second crank arms respectively for rotation of the crank responsive to reciprocating the first and second lower end regions along their respective lower arcuate paths.

32. The vehicle of claim 31 wherein:
the first ends of the first and second elongate members are coupled pivotally to the first and second lower end regions respectively, and the second ends of the first and second members are coupled pivotally to the first and second crank arms, respectively.

33. The vehicle of claim 31 wherein:
the first and second elongate members comprise drive members movable by leg power, and the first and second upper end regions are disposed to be reciprocated by hand using arm and shoulder power in concert with using leg power to move the drive members.

\* \* \* \* \*